United States Patent
Darak et al.

(10) Patent No.: US 10,986,118 B1
(45) Date of Patent: Apr. 20, 2021

(54) SYSTEMS AND METHODS FOR PREVENTING SYSTEM LEVEL BROWSER ATTACKS THROUGH MOBILE APPLICATIONS

(71) Applicant: Symantec Corporation, Mountain View, CA (US)

(72) Inventors: Anand Darak, Pune (IN); Anuradha Joshi, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 121 days.

(21) Appl. No.: 16/184,085

(22) Filed: Nov. 8, 2018

(51) Int. Cl.
*H04L 29/06* (2006.01)

(52) U.S. Cl.
CPC .......... *H04L 63/1441* (2013.01); *H04L 63/10* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,875,285 | B2* | 10/2014 | Cross | G06F 21/51 |
| | | | | 726/22 |
| 2013/0036466 | A1* | 2/2013 | Penta | H04L 63/102 |
| | | | | 726/22 |

OTHER PUBLICATIONS

Shaikh et al., "Preventing Application Installation Using System-Level Messages", U.S. Appl. No. 15/923,880, filed Mar. 16, 2018, 31 pages.
Rajput et al., "Systems and Methods for Preventing Sensitive Data Sharing", U.S. Appl. No. 16/018,035, filed Jun. 25, 2018, 58 pages.

* cited by examiner

*Primary Examiner* — Brandon S Hoffman
(74) *Attorney, Agent, or Firm* — FisherBroyles, LLP

(57) ABSTRACT

The disclosed computer-implemented method for preventing system level browser attacks through mobile applications may include (i) intercepting a message transmitted by a mobile application, wherein the message is based on data received by the mobile application, (ii) obtaining a universal resource locator (URL) from the message, (iii) obtaining reputation data using the URL, (iv) determining that the URL is for a malicious website based on the reputation data, and (v) in response to determining that the URL is for the malicious website, performing a security action to protect the computing device from system level browser attacks. Various other methods, systems, and computer-readable media are also disclosed.

18 Claims, 6 Drawing Sheets

SYSTEMS AND METHODS FOR PREVENTING SYSTEM LEVEL BROWSER ATTACKS THROUGH MOBILE APPLICATIONS

BACKGROUND

Users may interact with different applications on a computing device, such as a mobile device, for various reasons, such as checking e-mails, text messages, phone calls, browsing the Internet, and the like. In addition to their main functionality, some mobile applications may provide the ability to launch browser links from or through the mobile application. However, malware or ransomware may attempt to launch malicious links through external browsing applications from the mobile applications. Upon clicking such links in the mobile applications, the mobile applications may show browser or domain specific applications, depending on the link domain target. Some of these mobile applications may change their user interfaces to use custom views, inflated views, or web view-like alert windows to enable launching the provided links. Such measures by the malicious mobile applications may render accessibility-based detection useless. The instant disclosure, therefore, identifies and addresses a need for systems and methods for preventing system level browser attacks through mobile applications.

SUMMARY

As will be described in greater detail below, the instant disclosure describes various systems and methods for preventing system level browser attacks through mobile applications.

In one example, a method for preventing system level browser attacks through mobile applications may include (i) intercepting a message transmitted by a mobile application (e.g., the message may be based on data received by the mobile application), (ii) obtaining a universal resource locator (URL) from the message, (iii) obtaining reputation data using the URL, (iv) determining that the URL is for a malicious website based on the reputation data, and (v) in response to determining that the URL is for the malicious website, performing a security action to protect the computing device from system level browser attacks.

In some examples, the security action may include presenting, to a user of the computing device, a recommendation to block the URL. In response to presenting the recommendation, the computing device may receive an indication to block the URL. In response to receiving the URL, the computing device may block the URL. In some examples, in response to presenting the recommendation, an indication may be received to add the URL to a bypass list. The bypass list may be a list that includes URLs that bypass future security analysis. An association may be generated for the URL and an application specified in the indication. The application may be specified to launch the URL. In response to receiving the indication, the URL and the association may be added to the bypass list. In some examples, in response to presenting the recommendation, a request for additional information associated with the URL may be received. A warning may be presented to the user displaying the reputation data associated with the URL. In some examples, the security action may include identifying a user setting that includes URLs associated with malicious websites are to be blocked. The user setting may be enforced by blocking the URL in response to detecting that the URL is associated with the malicious website. In some examples, additional reputation data for the URL may be received from a user of the computing device. The additional reputation data may be transmitted to a remote server to be added to the reputation data associated with the URL. In some examples, the message intercepted from the mobile application may be a system level browse intent.

In one embodiment, a system for preventing system level browser attacks through mobile applications may include at least one physical processor and physical memory that includes computer-executable instructions that, when executed by the physical processor, cause the physical processor to (i) intercept a message transmitted by a mobile application (e.g., the message may be based on data received by the mobile application), (ii) obtain a universal resource locator (URL) from the message, (iii) obtain reputation data using the URL, (iv) determine that the URL is for a malicious website based on the reputation data, and (v) in response to determining that the URL is for the malicious website, perform a security action to protect the computing device from system level browser attacks.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept a message transmitted by a mobile application (e.g., the message may be based on data received by the mobile application), (ii) obtain a universal resource locator (URL) from the message, (iii) obtain reputation data using the URL, (iv) determine that the URL is for a malicious website based on the reputation data, and (v) in response to determining that the URL is for the malicious website, perform a security action to protect the computing device from system level browser attacks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
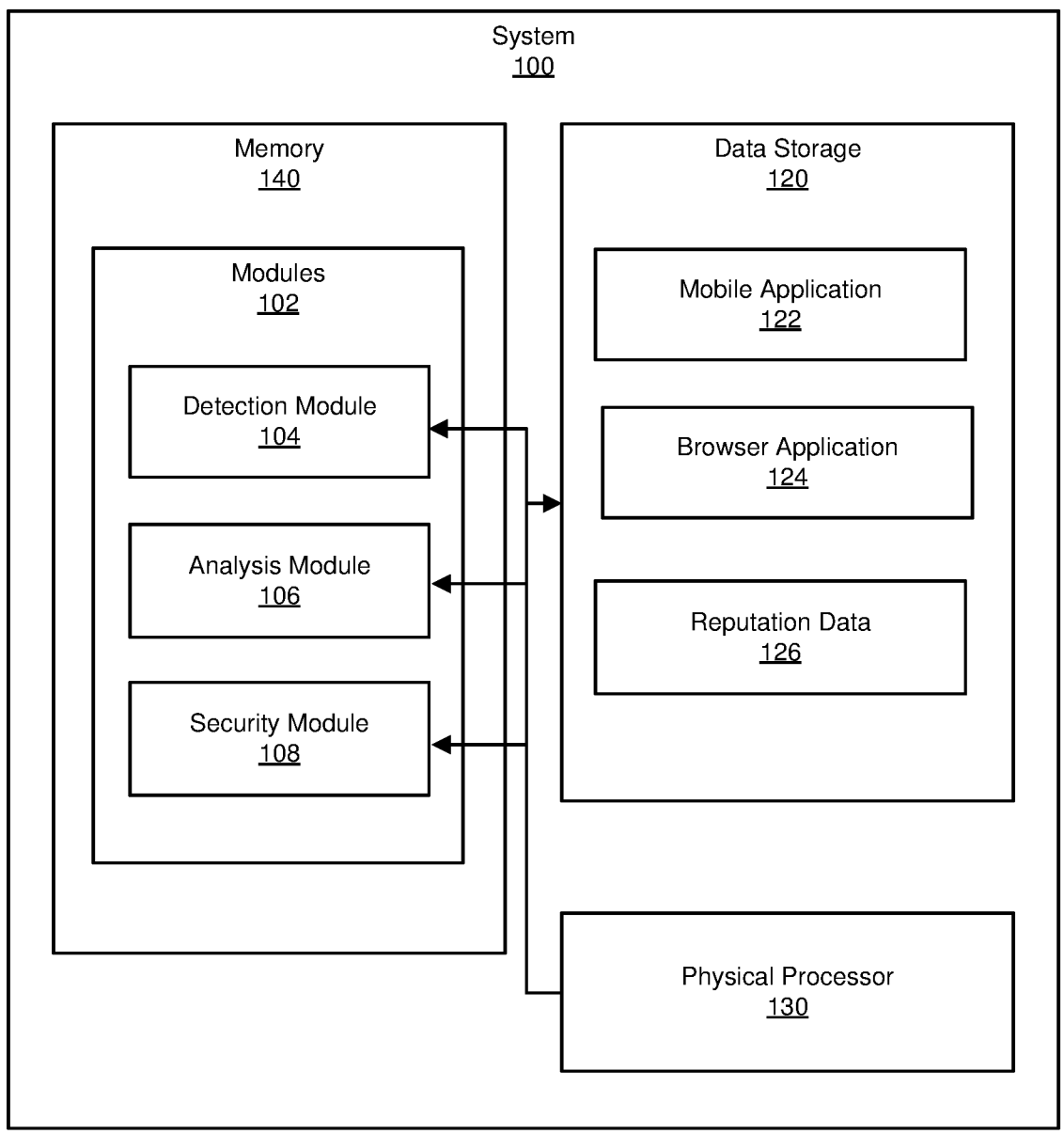
FIG. 1 is a block diagram of an example system for preventing system level browser attacks through mobile applications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing system level browser attacks through mobile applications. In some examples, the systems described herein may provide a front controller to intercept web browse intents triggered by mobile applications. If the web target of the browse intent directs to any compromised or malicious host, the system may provide an alert or warning to the user. If the web target or browse intent directs to a safe host, then the browse action may be launched in a browser, thus protecting the user from accidental malicious web surfing.

Figure 2:
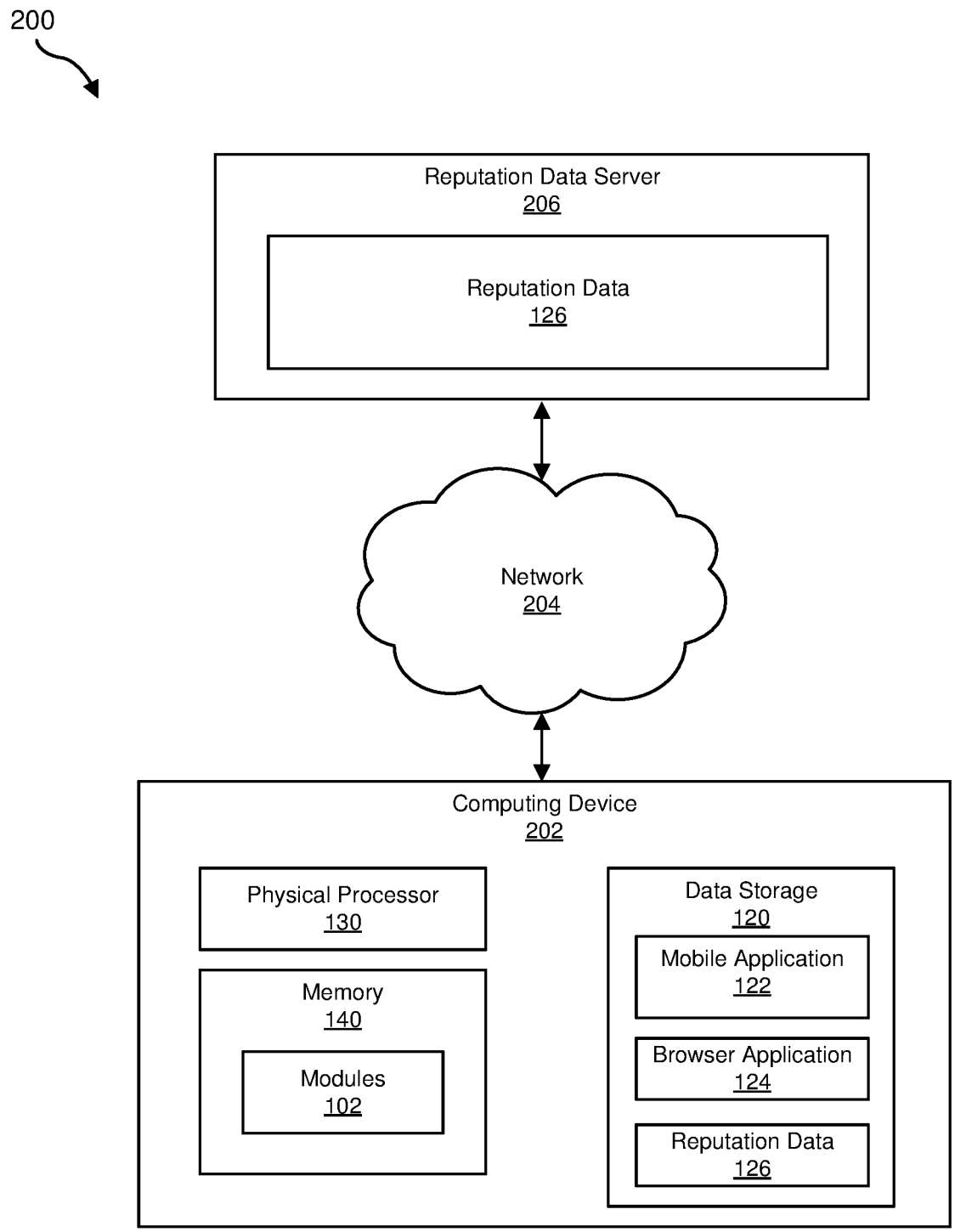
FIG. 2 is a block diagram of an additional example system for preventing system level browser attacks through mobile applications.

The following will provide, with reference to FIGS. 1-2, detailed descriptions of example systems for preventing system level browser attacks through mobile applications. Detailed descriptions of corresponding computer-implemented methods will also be provided in connection with FIG. 3. A detailed description of data flow through the example system for prevent system level browser attacks through mobile applications will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for preventing system level browser attacks through mobile applications. As illustrated in this figure, example system 100 may include one or more modules 102 for performing one or more tasks. As will be explained in greater detail below, modules 102 may include a receiving module 104, a detection module 104, an analysis module 106, and a security module 108. Although illustrated as separate elements, one or more of modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or reputation data server 206). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally or alternatively, the physical processor 130 may execute one or more of the modules 102 to facilitate preventing system level browser attacks through mobile applications. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store a mobile application 122, a browser application, and the reputation data 126.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with the reputation data server 206 via a network 204. In one example, all or a portion of the functionality of the modules 102 may be performed by the computing device 202, the reputation data server 206, and/or any other suitable computing system. As will be described in greater detail below, one or more of the modules 102 from FIG. 1 may, when executed by at least one processor of the computing device 202 and/or the reputation data server 206, enable the computing device 202 and/or the reputation data server 206 to prevent system level browser attacks through mobile applications 122. For example, and as will be described in greater detail below, one or more of the modules 102 may cause the computing device 202 and/or the reputation data server 206 to recite steps of method claim using FIG. 2.

The computing device 202 generally represents any type or form of computing device capable of reading computer-executable instructions. For example, the computing device 202 may include an endpoint device (e.g., a mobile computing device) running client-side security software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The reputation data server 206 generally represents any type or form of computing device that is capable of reading computer-executable instructions. In one example, the reputation data server 206 may be a server that manages and distributes the reputation data 126 obtained from different computing devices 202. Additional examples of the reputation data server 206 include, without limitation, security servers, application servers, web servers, storage servers, and/or database servers configured to run certain software applications and/or provide various security, web, storage, and/or database services. Although illustrated as a single entity in FIG. 2, the reputation data server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the reputation data server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
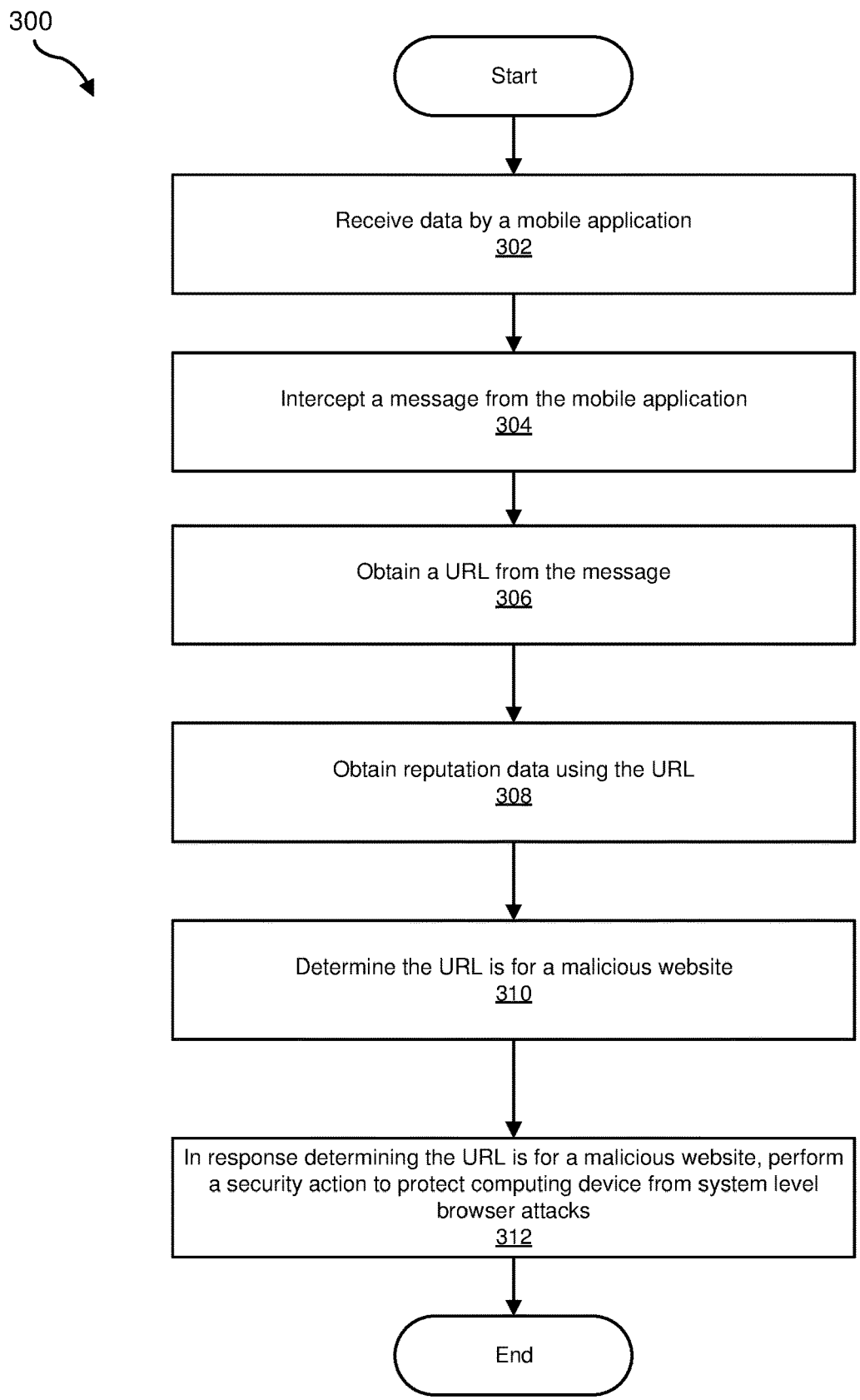
FIG. 3 is a flow diagram of an example method for preventing system level browser attacks through mobile applications.
Figure 4:
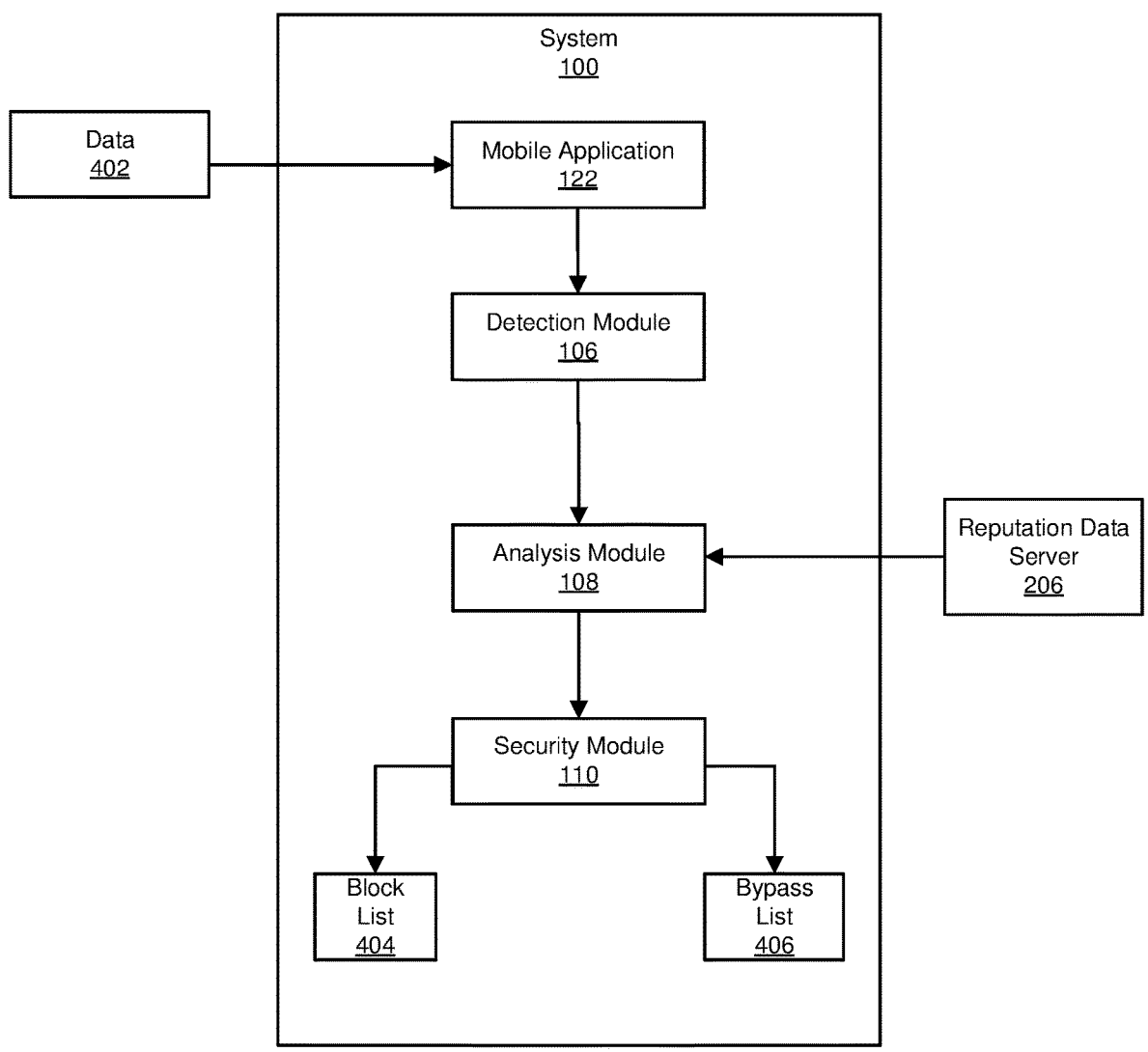
FIG. 4 is a data flow diagram of an example system for preventing system level browser attacks through mobile applications.

FIG. 3 is a flow diagram of an example computer-implemented method 300 for preventing system level browser attacks through mobile applications. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 the mobile application 122 of the computing device 202 may receive data. The mobile application 122 may receive the data in any suitable manner. For example, the data for the mobile application may be received from a user of the computing device 202 through a user interface or the mobile application 122 may be in communication with one or more remote servers associated with the mobile application 122. Examples of the data may include digital content (e.g., movies, songs, web content, etc.), advertisements, social networking messages, and the like.

The term "mobile application," as used herein, generally refers to an application that provides a specific capability as well as the ability to launch universal resource identifiers (URLs) through the external browsing application 124.

The term "browser application," as used herein, generally refers to an application that provides capabilities to access information on the internet or other specified remote devices. Examples of a browser application may include, but are not limited to Chrome™, Firefox™, Safari™, and/or Edge™.

At step 304, one or more of the systems described herein may intercept a message from the mobile application 122. The system 100 may intercept the message from the mobile application 122 in any suitable manner. For example, the mobile application 122 may generate a message based on the data it received in step 302. The data may include a hyperlink for a website. The mobile application 122 may transmit a message, such as a notification or communication (e.g., event from event handling system), indicating that the mobile application 122 is launching the browser application 124. The detection module 104 may intercept the message from the mobile application 122 prior to the launching of the browser application 124. In some examples, all messages (e.g., browsing intents) may be intercepted by or redirected to the detection module 104 prior to delivery of message to the browser application 124.

The term "message," as used herein, generally refers to a communication for an event from an event handling system. The messages, which may be referred to as "intents" may refer to messages which allow application components to request functionality from other application or system components. These messages may facilitate communication between components, such as starting an activity (e.g., a single screen in an application), starting a service (e.g., component that performs operations in the background without a user interact), or delivering a broadcast (e.g., message any application may receive).

In some examples, the message transmitted by the mobile application 122 may be based on the data from the mobile application 122. The message may be a system level browse intent issued by the mobile application 122.

At step 306, one or more of the systems described herein may obtain a URL from the message. The system 100 may obtain the URL from the message in any suitable manner. For example, detection module 104, may analyze the message and may identify the URL from the message. In some examples, the URL may be identified based on syntax or other rule-based analysis.

At step 308, one or more of the systems described herein may obtain reputation data based on the URL. The system 100 may obtain the reputation data based on the URL from the message in any suitable manner. For example, the analysis module 106 may query, using the URL, reputation data 126 stored locally, such as in data storage 120 of the computing device 202. In some examples, the analysis module 106 may transmit the URL to a server, such as the reputation data server 206. The reputation data server 206 may query a data store using the URL to identify any reputation data 126 associated with the URL. In some examples, reputation data server 206 may search the reputation data store for reputation data 126 associated with the URL or data substantially similar to the URL.

The term "reputation data," as used herein, generally refers to any type of data that may be used to categorize an identified URL. For example, reputation data may indicate whether a URL is associated with a malicious or fraudulent website or host. The reputation data may be historical data that has been collected from many users of the system who have provided feedback with regards to the URLs received. In some examples, the reputation data may be a collection of data obtained from analyzing URLs that have been transmitted through the system, which may user specific terminology or otherwise can be identified based on the content of the message, originator of the message, or the like.

At step 310, one or more systems described herein may determine that the URL is for a malicious or fraudulent website based on the reputation data. The system may perform step 310 in any suitable manner. For example, the analysis module 106 may analyze the obtained reputation data 126 and may determine that the URL is associated with a malicious or fraudulent website or computing device. The analysis module 106 may use one or more rules to apply to the reputation data associated with the URL. For example, a user-specified rule may indicate that any URL that has reputation data over a predefined minimum (e.g., over 85% negative feedback in the reputation data) may be categorized as malicious.

At step 312, one or more systems described herein may, in response to determining that the URL is for the malicious website, perform a security action to protect the computing device from system level browser attacks. The system may perform step 310 in any suitable manner. For example, security module 108 may perform the security action to protect the computing device 202 from system level browser attacks. The security module 108 may present a recommendation to block the URL to the user of the computing device 202. In response to presenting the recommendation, the security module 108 may receive an indication to block URL. In response to receiving the indication, the security module 108 may block the URL.

In some examples, the security module 108, in response to presenting the recommendation to block the URL, may receive an indication to add the URL to a bypass list. The bypass list may be a list of URLs that bypass future security analysis. In response to receiving the indication to add the URL to the bypass list, the security module 108 may add the URL to the bypass list. In some examples, the security module 108, in response to presenting the recommendation, may receive a request for additional information associated with the URL. The security module 108 may present a warning to the user displaying the reputation data associated with the URL. In some examples, the security module 108 may identify a user setting that indicates URLs associated with malicious websites are to be blocked. The security module 108 may enforce the user setting by blocking the URL in response to detecting that the URL is associated with the malicious website. In some examples, the security module 108 may receive additional reputation data for the URL from the user of the computing device 202. The security module 108 may transmit the additional reputation data to a remote server (e.g., reputation data server 206) to be added to the reputation data 126 associated with the URL.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of system 100, enable the system 400 to prevent system level browser attacks through mobile applications. For example, and as will be described in greater detail below, one or more of the modules 102 may cause the example system 400 to intercept, by the detection module 104, a message from the mobile application 122. The message may be generated by the mobile application 122 in response to receiving data 402, such as from a user or from a remote server. The message may be transmitted by the mobile application 122 based on the received data 402.

In some examples, the detection module 104 may intercept the message transmitted by the mobile application 122. The detection module 104 may transmit the message to the analysis module 106. The analysis module 106 may analyze the message and may obtain a universal resource locator (URL) from the message. For example, the analysis module 106 may parse the message and identify the URL based on syntax or other rule-based analysis.

The analysis module 106 may communicate with a reputation data server 206 and may obtain reputation data 126 based on the URL. For example, the analysis module 106 may request reputation data 126 associated with the identified URL or a portion of the URL (e.g., top-level domain name). Based on the received reputation data 126, the analysis module 106 may determine that the URL is for a malicious website.

In response to determining that the URL is for the malicious website, the security module 108, may perform a security action to protect the computing device 202 from system level browser attacks. In some examples, based on the determination by the analysis module 106, the security module 108 may add the URL to a block list 404. The security module 108 may receive an indication from the user to add the URL to the block list 404. Once the URL is added to the block list 404, upon future detection of the URL, the associated website will be automatically blocked from being launched.

In some examples, the security module 108 may receive an indication from the user to add the URL to the bypass list 406. In response to receiving the indication to add the URL to the bypass list, the security module 108 may add the URL to the bypass list 406. Upon future detection of the URL, if the URL is on the bypass list 406, the website associated with the URL may bypass future security analysis and may be launched by the browser application 124. In some examples, the security module 108 may present the user an option to select or configure a specific application (e.g., browser application 124) to launch the URL for future encounters. The security module 108 may generate an association for the specified application and the URL and store the association in the bypass list 406.

The systems and methods described herein are directed to preventing system level browser attacks through mobile applications. In some examples, the systems described herein may intercept web browse intents triggered by mobile applications. Based on the web browse intents, the system may obtain reputation data related to a hyperlink obtained from the browse intents. If the web target of the browse intent directs to any compromised or malicious host, based on the reputation data, the system may provide an alert or warning to the user. If the web target or browse intent directs to a safe host, based on the reputation data, then the browse action may be launched in a browser, thus protecting the user from accidental malicious web surfing.

Figure 5:
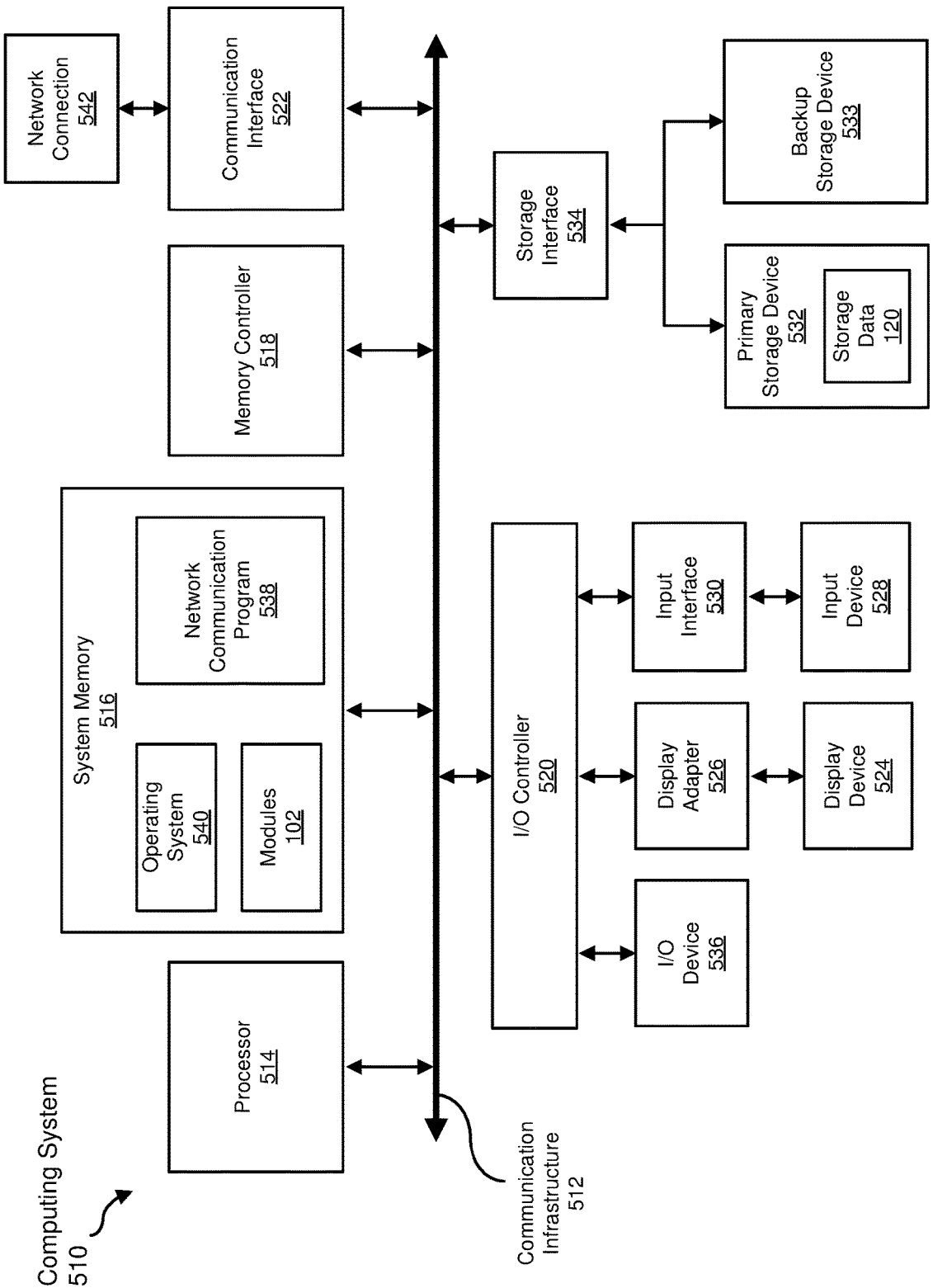
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, [the data storage 120] from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
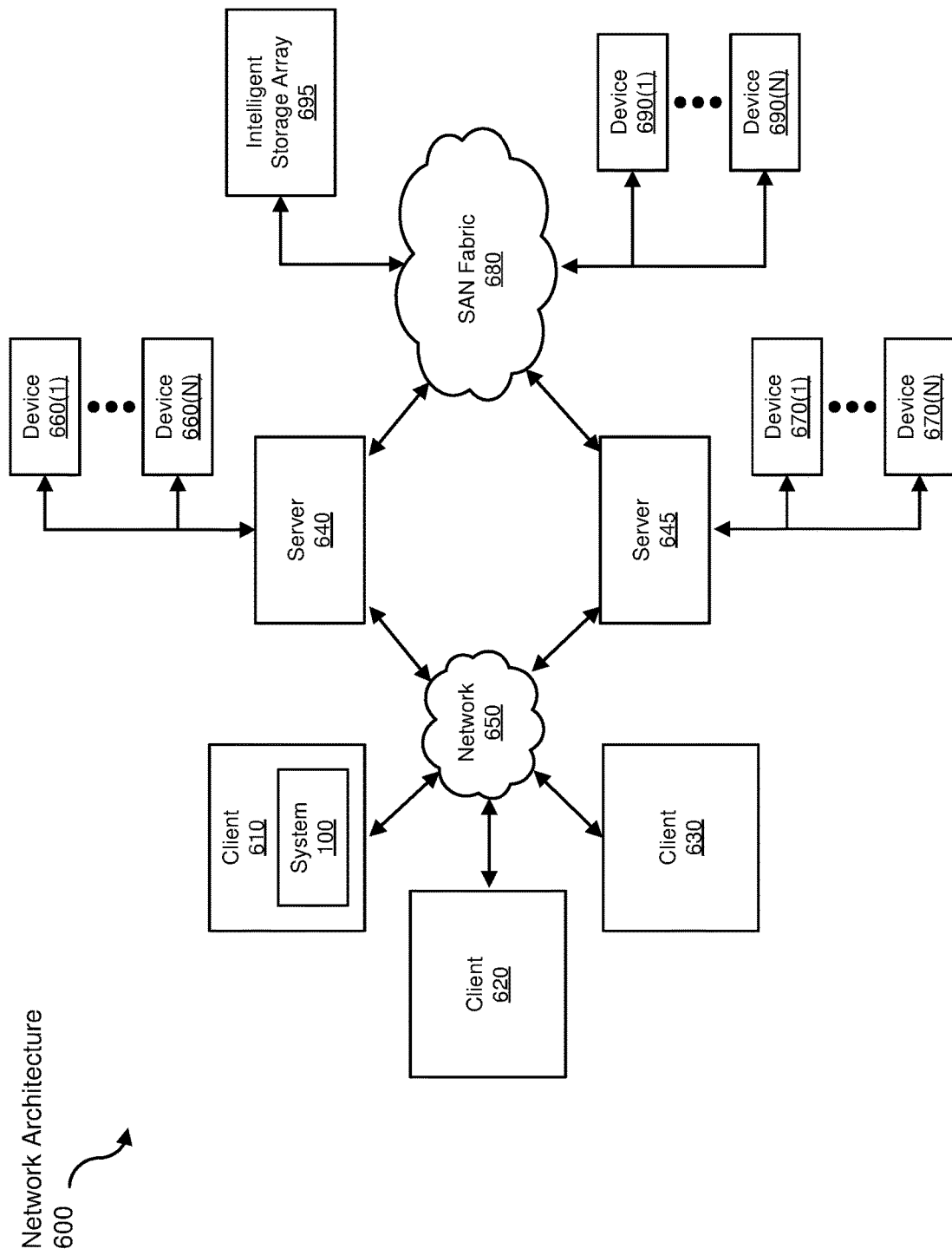
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preventing system level browser attacks through mobile applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing system level browser attacks through mobile applications, at least a portion of the method being performed by a computing device comprising at least one processor, the method comprising:
   intercepting, by the computing device prior to launching of a browser application, a message transmitted by a mobile application executing on the computing device, wherein the message is a system level browse intent that indicates that the mobile application is launching the browser application and is transmitted based on data received by the mobile application;
   obtaining a universal resource locator (URL) from the message;
   obtaining reputation data using the URL;
   determining that the URL is for a malicious website based on the reputation data; and
   in response to determining that the URL is for the malicious website, performing a security action to protect the computing device from system level browser attacks.

2. The computer-implemented method of claim 1, wherein the security action comprises:
   presenting, to a user of the computing device, a recommendation to block the URL.

3. The computer-implemented method of claim 2, further comprising:
   receiving, in response to presenting the recommendation, an indication to block URL; and
   in response to receiving the indication, blocking the URL.

4. The computer-implemented method of claim 2, further comprising:
   receiving, in response to presenting the recommendation, an indication to add the URL to a bypass list, wherein the bypass list comprise URLs that bypass future security analysis;
   generating an association for the URL with an application specified in the indication, wherein the application is specified to launch the URL; and
   in response to receiving the indication, adding the URL and the association to the bypass list.

5. The computer-implemented method of claim 2, further comprising:
   receiving, in response to presenting the recommendation, a request for additional information associated with the URL; and
   presenting, to the user, a warning displaying the reputation data associated with the URL.

6. The computer-implemented method of claim 1, wherein the security action comprises:
   identifying a user setting that indicates URLs associated with malicious websites are to be blocked; and
   enforcing the user setting by blocking the URL in response to detecting that the URL is associated with the malicious website.

7. The computer-implemented method of claim 1, further comprising:
   receiving additional reputation data for the URL from a user of the computing device; and
   transmitting the additional reputation data to a remote server to be added to the reputation data associated with the URL.

8. A system for preventing system level browser attacks through mobile applications, the system comprising:

at least one physical processor;

physical memory comprising computer-executable instructions that, when executed by the physical processor, cause the physical processor to:

intercept, prior to launching of a browser application, a message transmitted by a mobile application executing on the computing device, wherein the message is a system level browse intent that indicates that the mobile application is launching the browser application and is transmitted based on data received by the mobile application;

obtain a universal resource locator (URL) from the message;

obtain reputation data using the URL;

determine that the URL is for a malicious website based on the reputation data; and in response to determining that the URL is for the malicious website, perform a security action to protect a computing device from system level browser attacks.

9. The system of claim 8, wherein the security action comprises:

presenting, to a user of the computing device, a recommendation to block the URL.

10. The system of claim 9, wherein the computer-executable instructions further cause the computing device to:

receive, in response to presenting the recommendation, an indication to block URL; and in response to receiving the indication, block the URL.

11. The system of claim 9, wherein the computer-executable instructions further cause the computing device to:

receive, in response to presenting the recommendation, an indication to add the URL to a bypass list, wherein the bypass list comprise URLs that bypass future security analysis;

generate an association for the URL with an application specified in the indication, wherein the application is specified to launch the URL; and in response to receiving the indication, add the URL and the association to the bypass list.

12. The system of claim 9, wherein the computer-executable instructions further cause the computing device to:

receive, in response to presenting the recommendation, a request for additional information associated with the URL; and present, to the user, a warning displaying the reputation data associated with the URL.

13. The system of claim 8, wherein the security action comprises:

identifying a user setting that indicates URLs associated with malicious websites are to be blocked; and enforcing the user setting by blocking the URL in response to detecting that the URL is associated with the malicious website.

14. The system of claim 8, wherein the computer-executable instructions further cause the computing device to:

receive additional reputation data for the URL from a user of the computing device; and transmit the additional reputation data to a remote server to be added to the reputation data associated with the URL.

15. A non-transitory computer-readable medium comprising one or more computer-executable instructions that, when executed by at least one processor of a computing device, cause the computing device to:

intercept, prior to launching of a browser application, a message transmitted by a mobile application executing on the computing device, wherein the message is a system level browse intent that indicates that the mobile application is launching the browser application and is transmitted based on data received by the mobile application;

obtain a universal resource locator (URL) from the message;

obtain reputation data using the URL;

determine that the URL is for a malicious website based on the reputation data; and in response to determining that the URL is for the malicious website, perform a security action to protect the computing device from system level browser attacks.

16. The non-transitory computer-readable medium of claim 15, wherein the security action comprises:

presenting, to a user of the computing device, a recommendation to block the URL.

17. The non-transitory computer-readable medium of claim 16, wherein the one or more computer-executable instructions further cause the computing device to:

receive, in response to presenting the recommendation, an indication to block URL; and in response to receiving the indication, block the URL.

18. The non-transitory computer-readable medium of claim 16, wherein the one or more computer-executable instructions further cause the computing device to:

receive, in response to presenting the recommendation, an indication to add the URL to a bypass list, wherein the bypass list comprise URLs that bypass future security analysis;

generate an association for the URL with an application specified in the indication, wherein the application is specified to launch the URL; and in response to receiving the indication, add the URL and the association to the bypass list.

* * * * *